United States Patent
Morales et al.

(10) Patent No.: US 8,259,361 B2
(45) Date of Patent: Sep. 4, 2012

(54) GLOSSMARK-ENABLED PHOTO PRODUCT COMPOSITION STATION

(75) Inventors: Javier A. Morales, Rochester, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 838 days.

(21) Appl. No.: 12/408,374

(22) Filed: Mar. 20, 2009

(65) Prior Publication Data

US 2010/0238513 A1 Sep. 23, 2010

(51) Int. Cl.
*G06K 15/00* (2006.01)
*G06K 9/00* (2006.01)

(52) U.S. Cl. .................... 358/3.28; 358/3.06; 358/1.18; 382/100

(58) Field of Classification Search .................. 358/3.28, 358/3.06, 1.18; 382/100
See application file for complete search history.

(56) References Cited

U.S. PATENT DOCUMENTS

| | | | |
|---|---|---|---|
| 5,734,752 A | 3/1998 | Knox | 382/212 |
| 6,108,512 A | 8/2000 | Hanna | 399/366 |
| 7,148,999 B2 | 12/2006 | Xu et al. | 358/3.06 |
| 7,352,493 B2 | 4/2008 | Liu et al. | 358/3.06 |
| 7,391,537 B2 * | 6/2008 | Eschbach et al. | 358/3.06 |
| 2002/0051560 A1 | 5/2002 | Donescu et al. | |
| 2004/0247155 A1* | 12/2004 | Eguchi | 382/100 |
| 2005/0078974 A1 | 4/2005 | Uchida et al. | |
| 2006/0158688 A1 | 7/2006 | Mori | |

FOREIGN PATENT DOCUMENTS

| | | |
|---|---|---|
| EP | 1 768 376 A1 | 3/2007 |
| EP | 1 814 084 A2 | 8/2007 |
| EP | 1814084 A2 * | 8/2007 |
| EP | 1 959 387 A1 | 8/2008 |
| EP | 1959387 A1 * | 8/2008 |

OTHER PUBLICATIONS

EP Search Report for EP application No. 10156843.4 dated Oct. 21, 2010.

* cited by examiner

*Primary Examiner* — Charlotte M Baker
(74) *Attorney, Agent, or Firm* — Richard H. Krukar; Kermit D. Lopez; Luis M. Ortiz

(57) ABSTRACT

A photo composition system applies digital watermarks such as glossmarks and correlation marks to a user's image to produce a marked version of the image. A compatibility measure is computed and presented to the user as an aid in mark selection or the decision to even apply a mark to the image. Compatibility measures can be improved by automated image enhancement processes that adjust the image to be more compatible with the mark.

16 Claims, 6 Drawing Sheets

GLOSSMARK-ENABLED PHOTO PRODUCT COMPOSITION STATION

TECHNICAL FIELD

Embodiments are related to printing, printing kiosks, image processing and to the printing of digital images. Embodiments also relate to digital watermarks such as glossmarks and correlation marks.

BACKGROUND

People have saved and shared photographs since the commercialization of film photography. Although digital cameras have almost completely supplanted film cameras, people still often desire hand held photographs. Many people simply print their photographs on color printers whereas others purchase more specialized photo-printers that can produce a higher quality product. Another solution that has proven popular is the photo kiosk. A photo kiosk provides a photographer with access to high quality printing equipment that is outside the budgetary capability of most people. A photographer can, for a fee, submit image descriptions such as jpeg files to the kiosk and select printing options such as size, media, and finishing. The kiosk then prints out the photographer's images.

Digital watermarks provide for the authentication or tracking of documents. For example, American currency carries a watermark that can be observed under the correct viewing conditions. The water mark helps prevent counterfeiting because it represents a technological hurdle for counterfeiters. As such, the watermark helps authenticate the currency. Other types of digital watermarks have been developed. Glossmarks and correlation marks are examples of newer digital watermarks.

Glossmarks, also known as reflectivity marks, are taught in U.S. Pat. No. 6,108,512 "Copy prevention method", U.S. Pat. No. 7,148,999 "Variable glossmark" and in U.S. Pat. No. 7,352,493 "Enhancement of glossmark images at low and high densities". U.S. Pat. Nos. 6,108,512 and 7,148,999 teach printing glossmarks onto documents. Note that GlossMark is a registered trademark of Xerox corporation, and that Xerox Corporation owns U.S. Pat. Nos. 6,108,512, 7,148,999, and 7,352,493. Glossmarks are digital watermarks that are produced by printing patterns of reflectivity variation on the surface of a printed document or printed image. The reflectivity variations are most easily observed by tilting the page such that light is differentially reflected to the eye. U.S. Pat. No. 7,352,493 teaches ways to improve glossmark printing because glossmarks are more visible when printed over mid-tone document areas.

FIG. 7, labeled as "Prior Art", illustrates the classification of pixels as a function of pixel value. An arrow 701 indicates the direction of increasing pixel values where higher pixel values indicate lighter pixels. Dark pixels 702 have lower pixel values and light pixels 704 have higher pixel values. Mid-tone pixels 703 have midrange pixel values. For example, the mid-tones can be the middle third or middle quartile of pixel values. The light tones can be the upper third or upper quartile of pixel values. The dark tones can be the lower third or lower quartile of pixel values.

One type of correlation mark is taught in U.S. Pat. No. 5,734,752 "Digital watermarking using stochastic screen patterns". In essence, a correlation mark is a digital watermark that is invisible or hardly visible on a printed document or image but that becomes visible when the document is viewed through a correlation mask. A pattern printed onto a transparency is an example of a correlation mask. Aligning the correlation mask to the printed document or image causes a correlation image to become visible.

Many people desire the capability to use digital watermarks but lack access to the required specialized printers and also lack the required specialized skills. Systems and methods providing for the use of digital watermarks by non-expert users are needed.

BRIEF SUMMARY

Aspects of the embodiments address limitations and flaws in the prior art by providing a printing kiosk with a user interface that a person can use for printing images with digital watermarks.

It is therefore an aspect of the embodiments to accept an image description from a user. An image description contains data including image data representing a printable image. For example, many images are digitally stored in the JPEG image format that can contain time and date information as well as the image data.

It is also an aspect of the embodiments to accept a users choice to add a mark and to obtain a mark description such as a glossmark description or a correlation mark description. A mark description can be similar to an image description with the difference being that the mark is to be printed differently, perhaps with a special ink, dye, or toner.

It is a further aspect of the embodiments to determine a compatibility measure indicative of the compatibility of the image description and the mark description. For example, glossmarks are most visible when printed over mid-tones in the image and less visible when printed over light or dark tones. As such, the compatibility measure can be determined from the percentage of the glossmark overlying mid-tones.

It is yet another aspect of the embodiments to present the correlation measure to the user and to provide the user with an option to cancel the addition of the mark.

It is a yet further aspect of the embodiments to produce a marked image description from the image description and the mark description. The marked image description is printed to produce a marked image for the user.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

A photo composition system applies digital watermarks such as glossmarks and correlation marks to a user's image to produce a marked version of the image. A compatibility measure is computed and presented to the user as an aid in mark selection or the decision to even apply a mark to the image. Compatibility measures can be improved by automated image enhancement processes that adjust the image to be more compatible with the mark.

Figure 1:
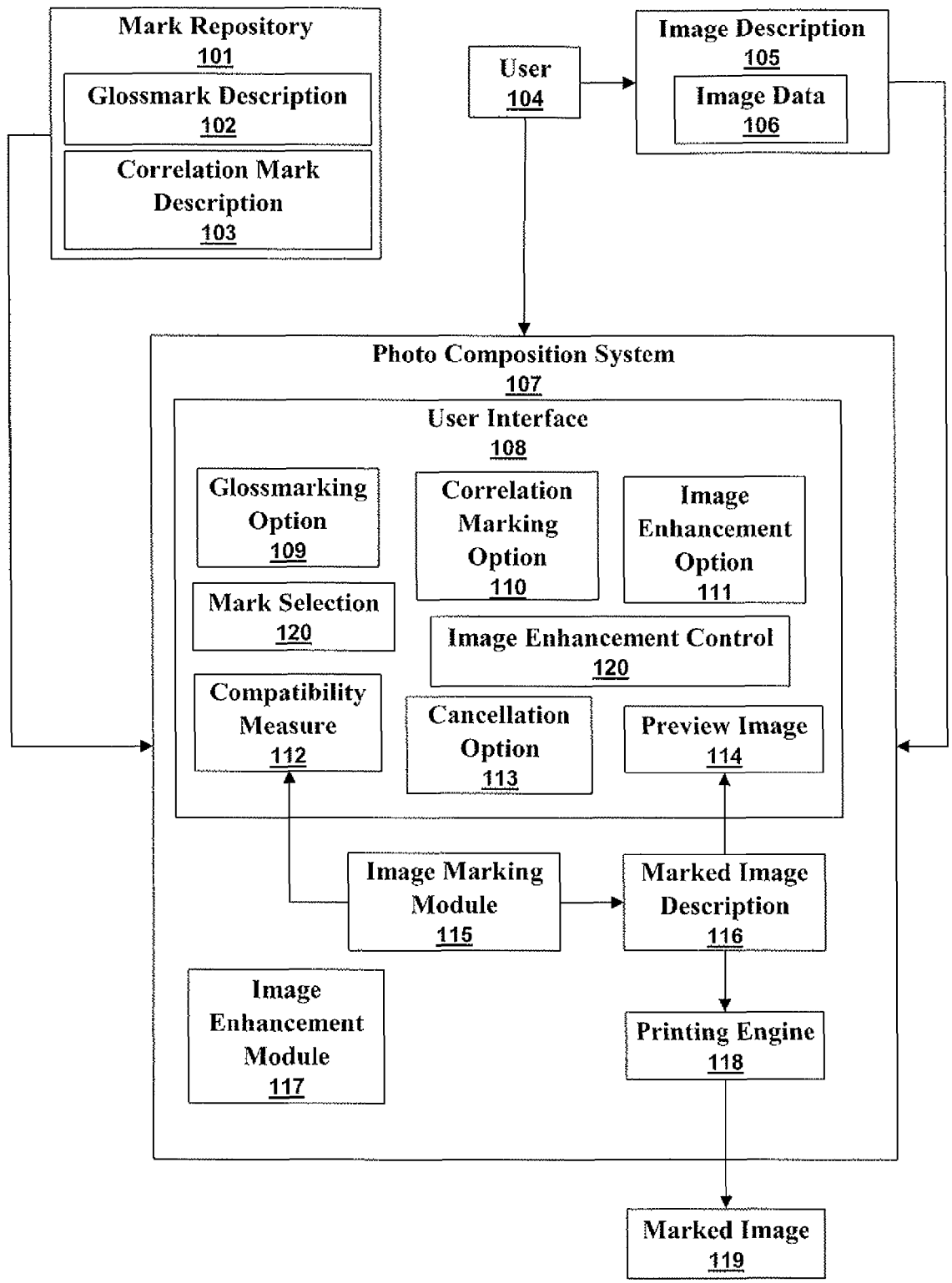
FIG. 1 illustrates a photo composition system that produces marked images in accordance with aspects of the embodiments.

FIG. 1 illustrates a photo composition system 107 that produces marked images 119 in accordance with aspects of the embodiments. A mark repository 101 stores mark descriptions such as glossmark description 102 and correlation mark description 103. A mark description contains mark data representing a printable mark. For example, a mark description can be in the JPEG image format, or any other image format, and describe an image that is to be printed with a special ink, dye, or toner to produce the mark. The mark repository 101 can supply a number of different marks to the photo composition system 107.

A user 104 submits an image description 105 that contains image data 106 representing a printable image. The image description 105 can be in any image format such as JPEG, PNG, or GIF. The photo composition system 107 contains a user interface 108 that the user 104 can interact with. Selecting a glossmarking option 109 causes a glossmark to be printed onto the image. Selecting a correlation marking option 110 causes a correlation mark to be printed onto the image. A cancellation option 113 provides an input to cancel printing the mark. The cancellation option 113 can be a dedicated cancellation input or can be provided by allowing the marking options 109, 110 to be de-selected. A mark selection 120 can offer the user a number of different marks. An image marking module 115 can produce a marked image description 116 and a compatibility measure 112. In some embodiments, a higher compatibility measure 112 indicates higher compatibility between the mark and the image and as such can indicate a glossmark's visibility, a correlation mark's invisibility, or a correlation image's visibility.

A preview image 114 can present a video representation of the marked image 119 such that the user 104 can observe the affect of the mark on the image. Upon the user's approval, a printing engine 1 18 can print the marked image 119.

The user 104 can select an image enhancement option 111 such that an image enhancement module 117 modifies the image description 105 to improve the compatibility measure 112. For example, the image's histogram or its tone reproduction curve (TRC) can be adjusted. Compatibility with a glossmark can be improved by mapping image pixels to midtone levels.

The user 104 can manipulate an image enhancement control 120 that controls the aggressiveness with which image enhancement is applied. For example, a low setting of the image enhancement control 120 can correspond to small TRC or histogram adjustments whereas a high setting can correspond to large adjustments. Smaller the adjustments result in an enhanced image that is similar to the original image. Very large adjustments can create unacceptably large differences.

Figure 2:
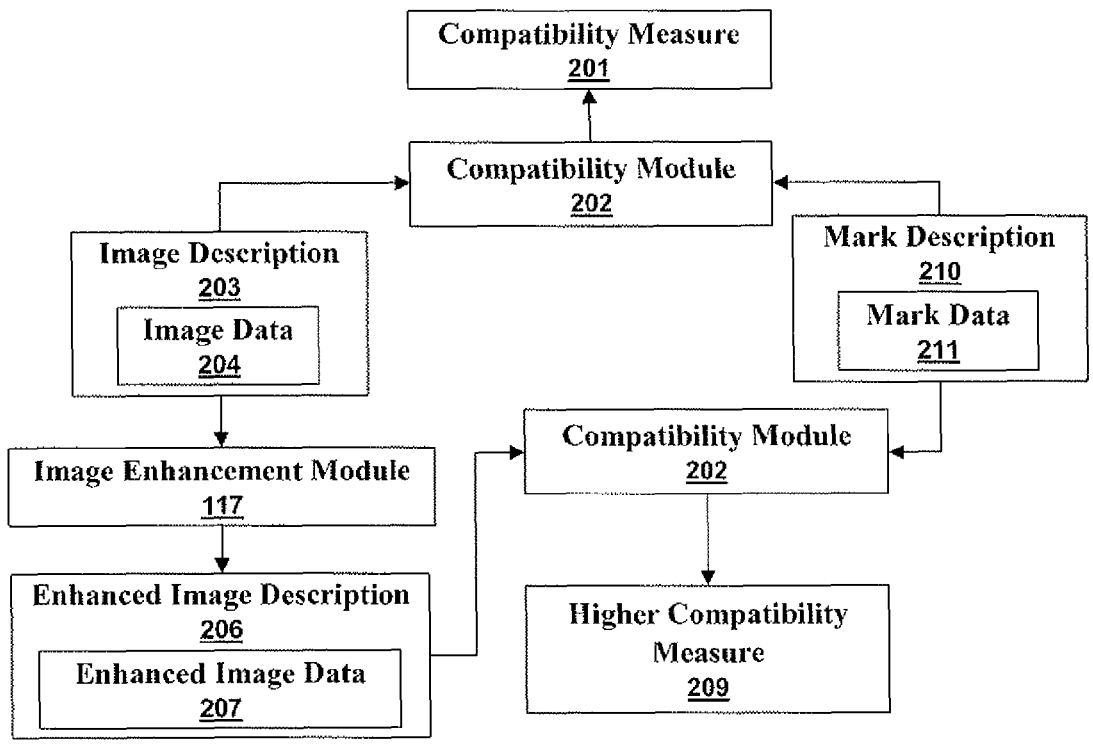
FIG. 2 illustrates an image enhancement module improving a compatibility measure in accordance with aspects of the embodiments.

FIG. 2 illustrates an image enhancement module 117 improving a compatibility measure 201 in accordance with aspects of the embodiments. A compatibility module 202 can accept an image description 203 containing image data 204 and can accept a mark description 210 containing mark data 211. The compatibility module 202 can then calculate a compatibility measure 201. Note that the image marking module 119 can implicitly or explicitly contain a compatibility module 202. An image enhancement module 117 can process the image description 203 to produce an enhanced image description 206 containing enhanced image data 207. The enhanced image description 207 is more compatible with the mark description 210 as indicated by the higher compatibility measure 209 calculated by the compatibility module 202.

Figure 3:
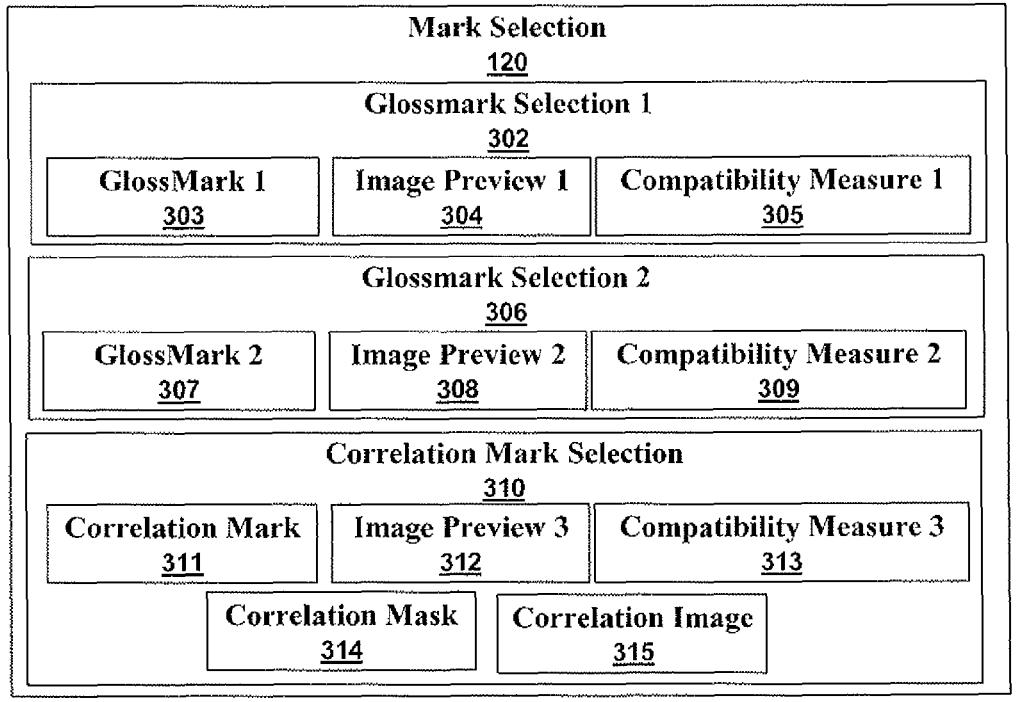
FIG. 3 illustrates a mark selection in accordance with aspects of the embodiments.

FIG. 3 illustrates a mark selection 120 in accordance with aspects of the embodiments. The mark selection is illustrated as offering the user glossmark selection 1 302, glossmark selection 2 306, and correlation mark 310. Glossmark selection 1 302 is for glossmark 1 303 and presents image preview 1 304 and compatibility measure 1 305 indicating the mark's compatibility with the image. The preview image provides visual confirmation of the compatibility. Glossmark selection 2 306 is for glossmark 2 307 and presents image preview 2 308 and compatibility measure 2 309. Correlation mark selection 310 is for correlation mark 311 and presents image preview 3 312, compatibility measure 3 313, and previews of the correlation mask 314 and correlation image 315. Typically, the correlation mask 314 is an image that can be printed onto a transparency. Properly positioning the transparency over the marked image reveals the correlation image.

Figure 4:
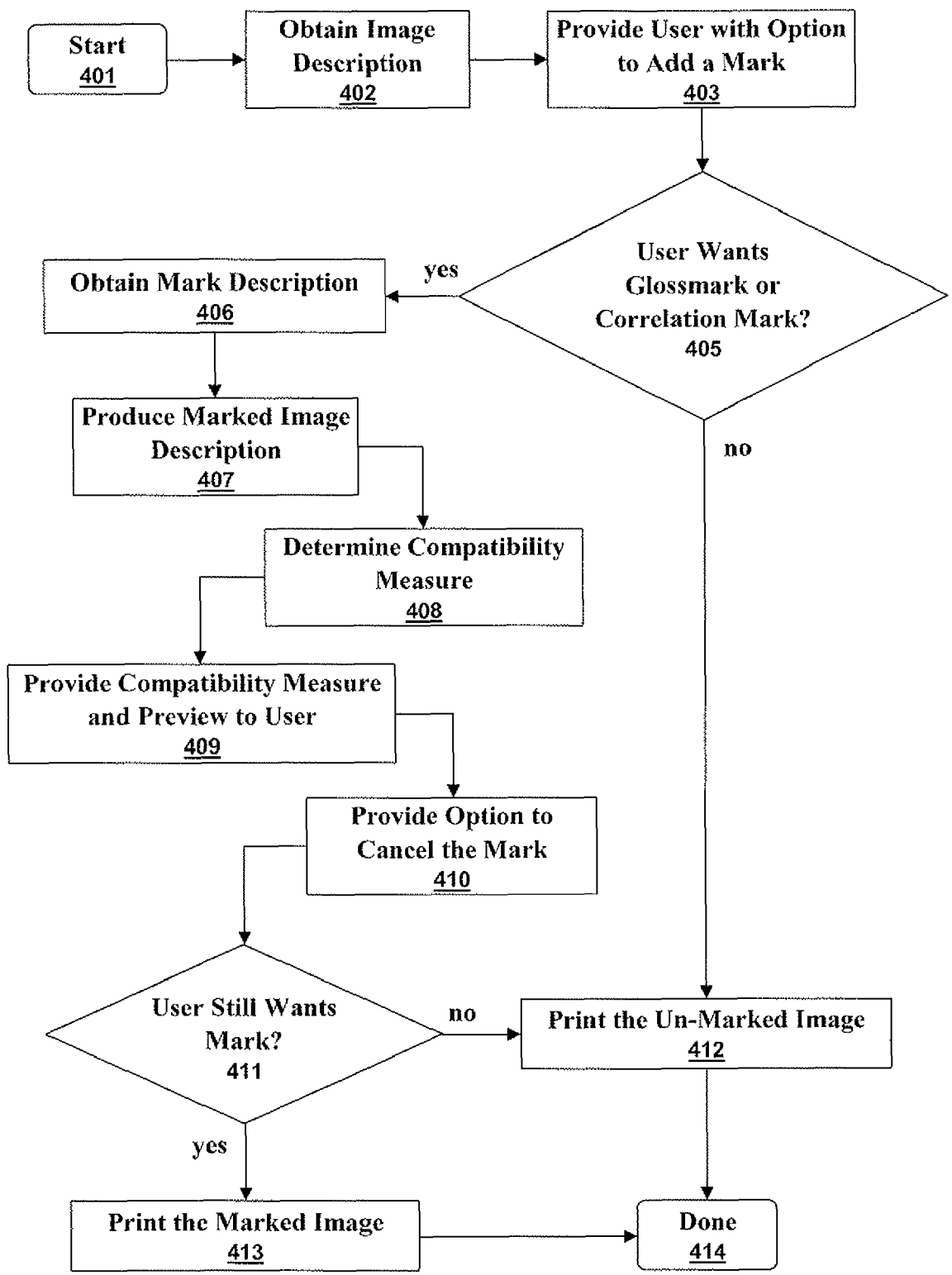
FIG. 4 illustrates a high level flow diagram of marking an image in accordance with aspects of the embodiments.

FIG. 4 illustrates a high level flow diagram of marking an image in accordance with aspects of the embodiments. After the start 401, an image description is obtained 402 from a user. The user is offered the option to add a digital watermark 403. If the user does not want a glossmark or correlation mark 405 then the unmarked image is printed 412 and the process is done 414. Otherwise, a mark description is obtained 406 and combined with the image description to produce a marked image description 407. A compatibility measure is determined 408. The compatibility measure and a preview of the marked image are provided to the user 409 along with an option to cancel the mark 410. If the user no longer wants to mark the image 41 1, the unmarked image is printed 412 and the process is done 414. Otherwise, the marked image is printed 413 and the process is done 414.

Figure 5:
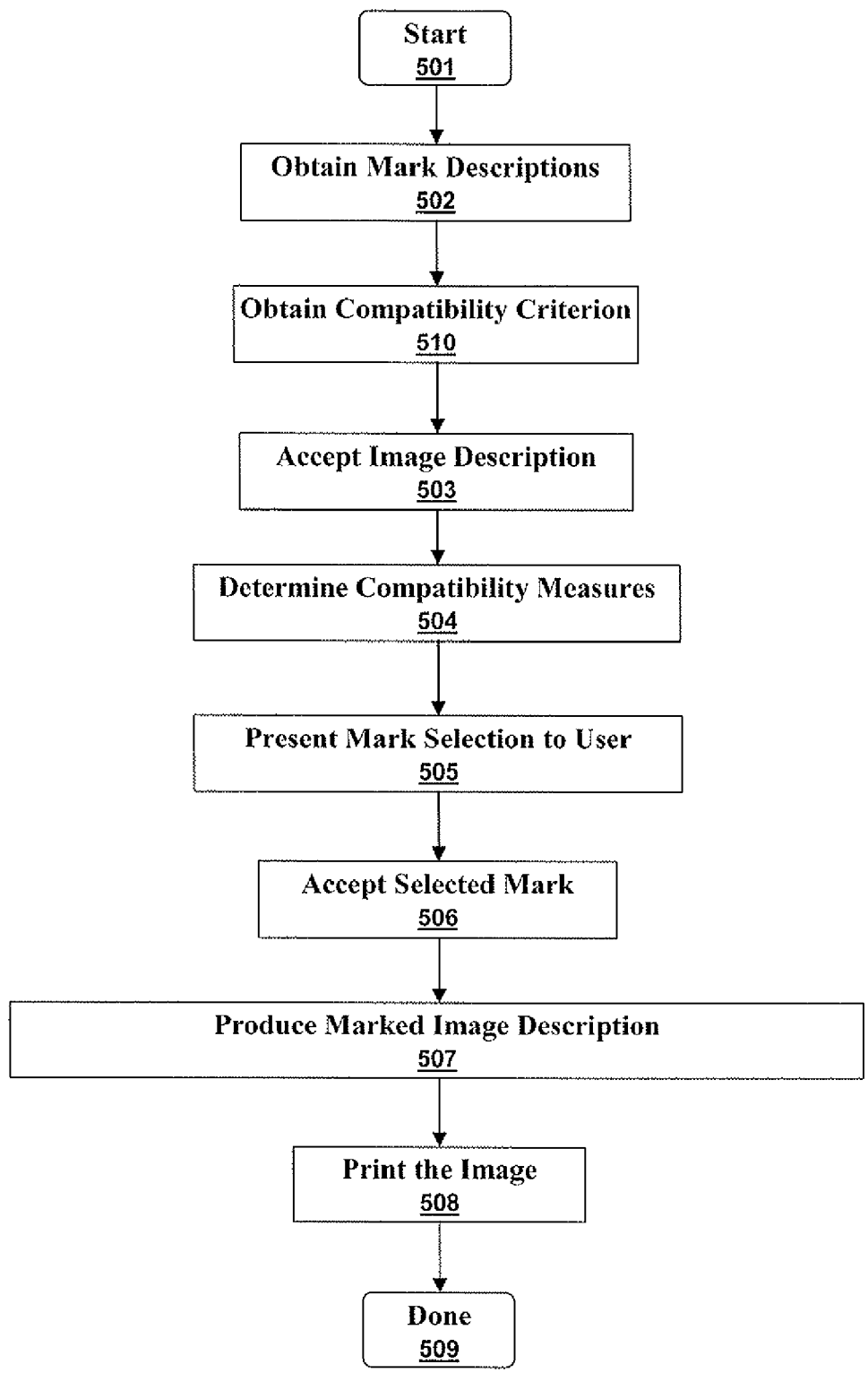
FIG. 5 illustrates a high level flow diagram of selecting a mark and marking an image in accordance with aspects of the embodiments.

FIG. 5 illustrates a high level flow diagram of selecting a mark and marking an image in accordance with aspects of the embodiments. After the start 501, mark descriptions are obtained 502 and a compatibility criterion is obtained 510. Then an image description is accepted 503 from a user. Compatibility measures indicating the compatibility between the image description and the mark descriptions are calculated 504 and presented to the user 505. The user selects a mark and the selected mark is accepted 506. The selected mark description and the image description are combined to produce a marked image description 507 that is printed 508 before the process is done 509.

A compatibility criterion is used to determine the compatibility measure. For example, the compatibility criterion can specify a compatible count and an incompatible count. The compatible count is the number of glossmark pixels coinciding with mid-tone image pixels. The incompatible count is the number of glossmark pixels coinciding with dark image pixels or light image pixels. The compatibility measure can then be specified as the ratio of compatible pixels to incompatible pixels, as the ratio of compatible pixels to the total number of image pixels, or even to one minus the ratio of incompatible pixels to total image pixels.

Figure 6:
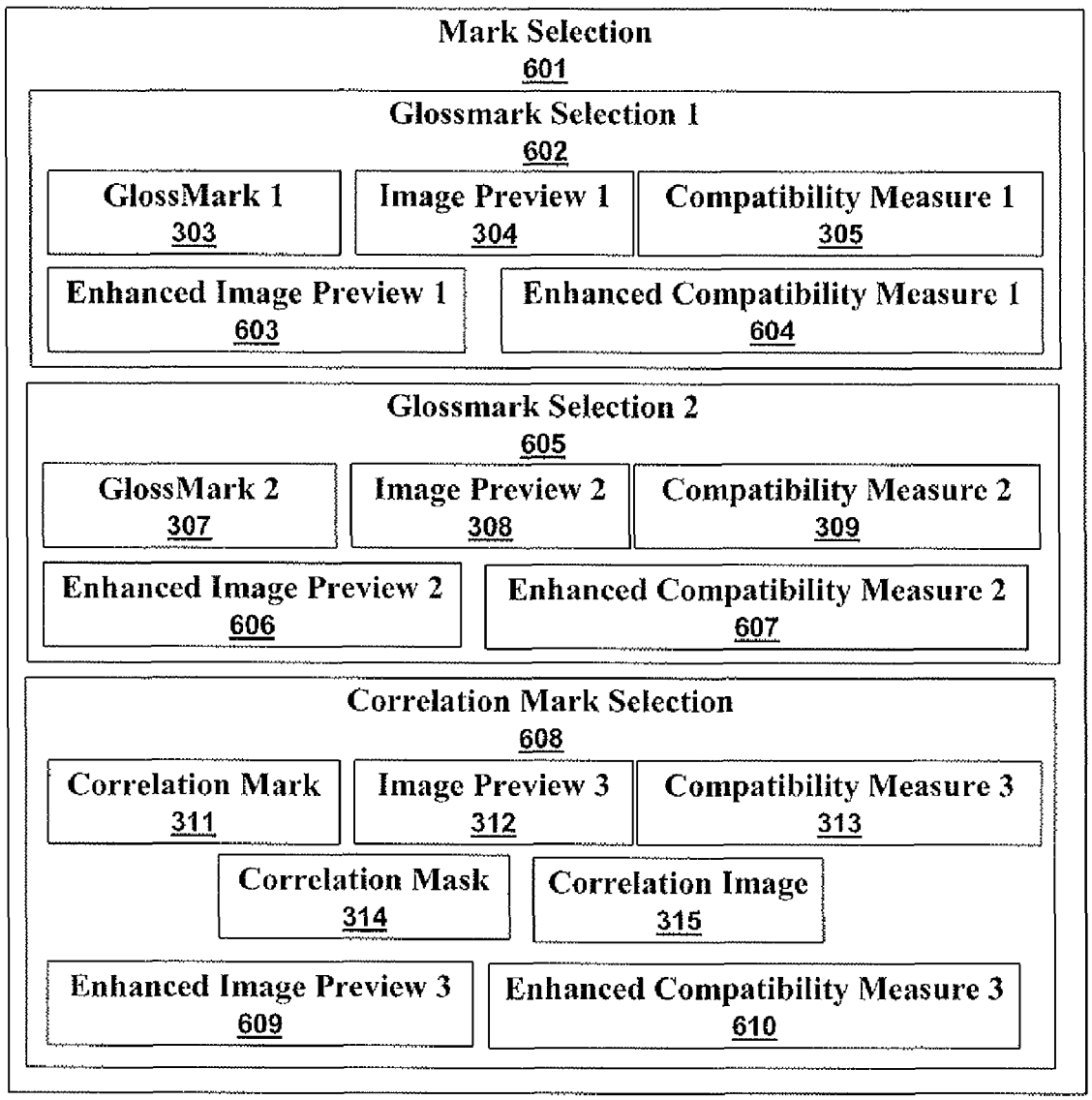
FIG. 6 illustrates a mark selection with image enhancement in accordance with aspects of the embodiments.
Figure 7:
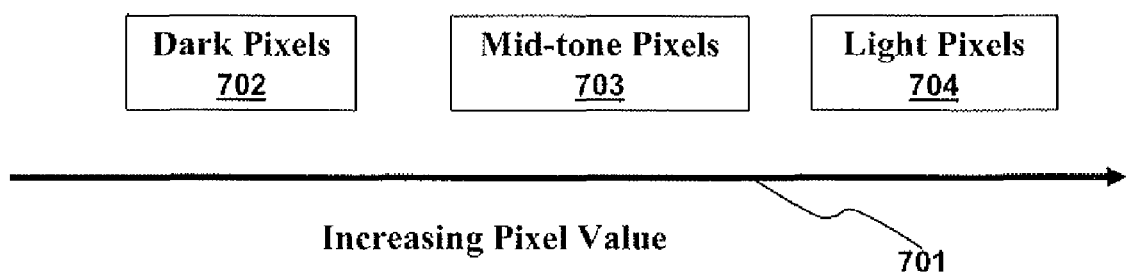
FIG. 7, labeled as "Prior Art", illustrates the classification of pixels as a function of pixel value.

FIG. 6 illustrates a mark selection 601 with image enhancement in accordance with aspects of the embodiments. The mark selection 601 of FIG. 6 is similar to that of FIG. 3 with the exception that certain elements are added. Glossmark selection 1 602 additionally includes enhanced image preview 1 603 and enhanced compatibility measure 1 604. Glossmark selection 2 605 additionally includes enhanced image preview 2 606 and enhanced compatibility measure 2 607. Correlation mark selection 608 additionally includes enhanced image preview 3 609 and enhanced compatibility measure 3 610. The enhanced image previews 603, 606, 609 are visual predictions of the appearance of the printed image after image enhancement and marking. The enhanced compatibility measures 604, 607, 610 indicate the compatibility between the marks and the automatically enhanced version of an image.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   accepting an image description from a user wherein the image description comprises image data representing a printable image;
   accepting a glossmarking choice from the user wherein the user chooses to add a glossmark;
   obtaining a glossmark description comprising mark data representing a printable glossmark;
   evaluating the image description and the glossmark description and computing a compatibility measure indicating compatibility between the image description and the glossmark description and reporting the compatibility measure to the user;
   providing an option to cancel adding the glossmark;
   providing the user with an image enhancement option;
   submitting the image description to an image enhancement module that produces an enhanced image description that is more compatible with the glossmark description; and
   producing the marked image description from the glossmark description and the enhanced image description;
   printing the marked image description with a printing engine to produce a marked image.

2. The method of claim 1 further comprising:
   providing a preview image to the user before removing the option to cancel adding the glossmark wherein the preview image is a video representation of the marked image.

3. The method of claim 2 further comprising offering the user a glossmark selection comprising a plurality of available glossmarks and wherein the glossmark is one of the available glossmarks.

4. The method of claim 1 wherein a higher compatibility measure indicates higher gloss mark visibility when the marked image is properly viewed.

5. The method of claim 1 further comprising obtaining a compatibility criteria that determines the compatibility measure.

6. The method of claim 1 further comprising:
   providing a preview image to the user wherein the preview image is a video representation of the marked image; and
   providing the user with an option to cancel automated image enhancement.

7. The method of claim 1 further comprising accepting an enhancement value from the user to thereby provide the user with control how compatible the enhanced image and the glossmark are.

8. A method comprising:
   accepting an image description from a user wherein the image description comprises image data representing a printable image;
   accepting a correlation marking choice from the user wherein the user chooses to add a correlation mark;
   obtaining a correlation mark description comprising mark data representing a printable correlation mark;
   evaluating the image description and the correlation mark description and computing a compatibility measure indicating compatibility between the image description and the correlation mark description and reporting the compatibility measure to the user;
   providing an option to cancel adding the correlation mark;
   providing the user with an image enhancement option;
   submitting the image description to an image enhancement module that produces an enhanced image description that is more compatible with the correlation mark description; and
   producing the marked image description from the correlation mark description and the enhanced image description.
   printing the marked image description with a printing engine to produce a marked image.

9. The system of claim 8 wherein the correlation mark description is associated with a correlation mask description corresponding to a correlation mask wherein placing the correlation mask over the marked image reveals a correlation image wherein the compatibility measure is based on a masked visibility factor and an unmasked visibility factor, wherein the masked visibility factor indicates correlation image visibility and wherein the unmasked visibility factor indicates correlation mask invisibility.

10. The method of claim 8 further comprising:
    providing a preview image to the user before removing the option to cancel adding the correlation mark wherein the preview image is a video representation of the marked image.

11. The system of claim 8 wherein a higher compatibility measure indicates lower visibility of the correlation mark within the marked image.

12. The system of claim 8 wherein the correlation mark description is associated with a correlation mask description corresponding to a correlation mask wherein masking the marked image with the correlation mask reveals a correlation image and wherein the compatibility measure is an indication of correlation image visibility.

13. A method comprising:
  obtaining a plurality of mark descriptions each comprising mark data representing a printable mark;
  accepting an image description from a user wherein the image description comprises image data representing a printable image;
  evaluating the image description and each of the marking descriptions to compute a plurality of compatibility measures wherein each of the marking descriptions is associated with a compatibility measure indicating compatibility with the printable image;
  presenting a mark selection comprising a plurality of marking options corresponding to the marking descriptions and further comprising the compatibility measures associated with the mark descriptions;
  accepting a selected mark description from the user wherein the selected mark description is one of the mark descriptions and wherein the selected mark description comprises mark data representing a selected mark;
  providing the image description and the correlation mark description to an image enhancement module that produces an enhanced image description that is more compatible with the correlation mark description than the image description; and
  providing the user an option to use the enhanced image description within the mark selection;
  producing a marked image description from the enhanced image description and the selected mark description;
  printing the marked image description with a printing engine to produce a marked image.

14. The method of claim 13 wherein the mark descriptions comprise a gloss mark description and wherein a higher compatibility measure between the gloss mark description and the image description indicates that the gloss mark is more visible in the marked image when properly viewed.

15. The method of claim 14 further comprising:
  providing the image description and the gloss mark description to an image enhancement module that produces an enhanced image description that is more compatible with the glossmark description than the image description; and
  including the enhanced image description within the mark selection.

16. The method of claim 13 wherein the mark descriptions comprise a correlation mark description and wherein a higher compatibility measure between the correlation mark description and the image description indicates that the correlation mark is less visible in the marked image when properly viewed.

* * * * *